US011043821B2

(12) United States Patent
Nishikawa et al.

(10) Patent No.: US 11,043,821 B2
(45) Date of Patent: Jun. 22, 2021

(54) ELECTRICITY STORAGE SYSTEM AND MANAGEMENT DEVICE

(71) Applicant: Panasonic Intellectual Property Management Co., Ltd., Osaka (JP)

(72) Inventors: Shinya Nishikawa, Osaka (JP); Kazufumi Nishikawa, Osaka (JP); Tohru Watanabe, Gifu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 16/617,556

(22) PCT Filed: Apr. 26, 2018

(86) PCT No.: PCT/JP2018/016898
§ 371 (c)(1),
(2) Date: Nov. 27, 2019

(87) PCT Pub. No.: WO2018/225416
PCT Pub. Date: Dec. 13, 2018

(65) Prior Publication Data
US 2020/0161875 A1 May 21, 2020

(30) Foreign Application Priority Data

Jun. 8, 2017 (JP) .............................. JP2017-113751

(51) Int. Cl.
*H02J 7/00* (2006.01)
(52) U.S. Cl.
CPC .......... *H02J 7/0013* (2013.01); *H02J 7/0048* (2020.01); *H02J 2207/20* (2020.01)
(58) Field of Classification Search
CPC .... H02J 7/0013; H02J 7/0048; H02J 2207/20; H02J 7/0024; H02J 7/00304; H02J 3/32;
(Continued)

(56) References Cited

U.S. PATENT DOCUMENTS

2013/0293198 A1* 11/2013 Nakashima ........... H02J 7/0016
320/118
2015/0364797 A1    12/2015 Inaba et al.

FOREIGN PATENT DOCUMENTS

WO    2014/128941    8/2014

OTHER PUBLICATIONS

International Search Report of PCT application No. PCT/JP2018/016898 dated May 29, 2018.

* cited by examiner

*Primary Examiner* — Toan T Vu
(74) *Attorney, Agent, or Firm* — McDermott Will and Emery LLP (57) ABSTRACT

In a power storage system, a management device calculates a state of power (SOP) of a whole of a plurality of power storage blocks connected in parallel based on an SOP of each of the plurality of power storage blocks. At least one of the plurality of power storage blocks is disconnected from the power storage system, and when at least one switch is turned on to return at least one disconnected power storage block to the power storage system having the parallel-connected power storage blocks, the management device calculates an SOP of a whole of the power storage blocks after a return of the at least one power storage block based on a deviation in current between each of the power storage blocks including the at least one returned power storage block to determine an upper limit level of power or current flowing into a power converter.

7 Claims, 4 Drawing Sheets

(58) Field of Classification Search
CPC ...... H02J 7/02; H02J 1/10; H02J 3/381; H02J 3/383; H02J 3/386; H02J 2300/20; H02J 2300/24; H02J 2300/28; H02J 2300/30; H02J 2300/40; H02J 3/382; H02J 3/387; H01M 10/441; H01M 16/006; Y02E 10/56; Y02E 10/76; Y02E 60/10; Y02E 60/50
USPC ........................ 307/20, 43, 83; 320/118, 134
See application file for complete search history.

ELECTRICITY STORAGE SYSTEM AND MANAGEMENT DEVICE

CROSS-REFERENCE TO RELATED APPLICATIONS

This application is a U.S. national stage application of the PCT International Application No. PCT/JP2018/016898 filed on Apr. 26, 2018, which claims the benefit of foreign priority of Japanese patent application 2017-113751 filed on Jun. 8, 2017, the contents all of which are incorporated herein by reference.

TECHNICAL FIELD

The present invention relates to a power storage system in which a plurality of power storage blocks are interconnected in parallel. The present invention also relates to a management device.

BACKGROUND ART

Recently, power storage systems have been widespread and are used for peak shift, backup, frequency regulation (FR), and other purposes. A huge power storage system is constructed by, for example, connecting in parallel a plurality of power storage blocks each composed by connecting in series a plurality of power storage modules. In this specification described hereinafter, it is assumed that the power storage block is a power storage rack including a plurality of power storage modules stacked in a rack.

A method used by a power storage system to reduce a deviation in current between power storage racks when a disconnected power storage rack returns to the system during charging or discharging, involves estimating internal resistance of each of the power storage racks and controlling the power storage racks so as to stabilize an average value of currents flowing through the power storage racks after the disconnected power storage rack returns (as is suggested in PTL 1, for example).

CITATION LIST

Patent Literature

PTL 1: WO 2014/128941 A

SUMMARY OF THE INVENTION

Accuracy with which the power storage racks are controlled as described above depends on accuracy in estimation of the internal resistance. Improving the accuracy in estimation of the internal resistance entails an increase in calculation and memory costs. Even if the currents are uniform immediately after the return of the disconnected power storage rack, the occurrence of a deviation in current between the power storage racks afterward can suddenly change charge or discharge power, resulting in a flow of an excessively high current into some of the power storage racks.

The present invention has been accomplished in view of the situation above, and it is an object of the present invention to provide a power storage system including a plurality of power storage blocks connected in parallel with a technique for preventing a flow of an excessively high current into some of the power storage blocks during operation of the power storage system.

Solution to Problem

A power storage system according to an aspect of the present invention, accomplished to solve the challenge described above, includes a plurality of power storage blocks connected in parallel, a power converter (power conditioning system (PCS)) converting direct current (DC) power discharged from the plurality of the power storage blocks into alternating current (AC) power to output the AC power to a power system (power grid) or a load and converting AC power sent from the power system into DC power to charge the plurality of power storage blocks, a plurality of switches interposed between the plurality of respective power storage blocks and the power converter, and a management device calculating a state of power (SOP) of a whole of the plurality of power storage blocks based on an SOP of each of the plurality of power storage blocks to specify the calculated SOP of the whole for an upper limit level of power or current for at least one of charging and discharging controlled by the power converter. At least one of the plurality of power storage blocks connected in parallel is disconnected from the power storage system if at least one of the plurality of switches is turned off, and when the at least one switch is turned on to return the at least one disconnected power storage block to the power storage system having the parallel-connected power storage blocks, the management device calculates an SOP of a whole of the power storage blocks after a return of the at least one power storage block based on a deviation in current between each of the power storage blocks including the at least one returned power storage block to determine an upper limit level of power or current flowing into the power converter.

Advantageous Effect of Invention

According to the present invention, a power storage system including a plurality of power storage blocks connected in parallel prevents a flow of an excessively high current into some of the power storage blocks during operation.

DESCRIPTION OF EMBODIMENT

Figure 1:
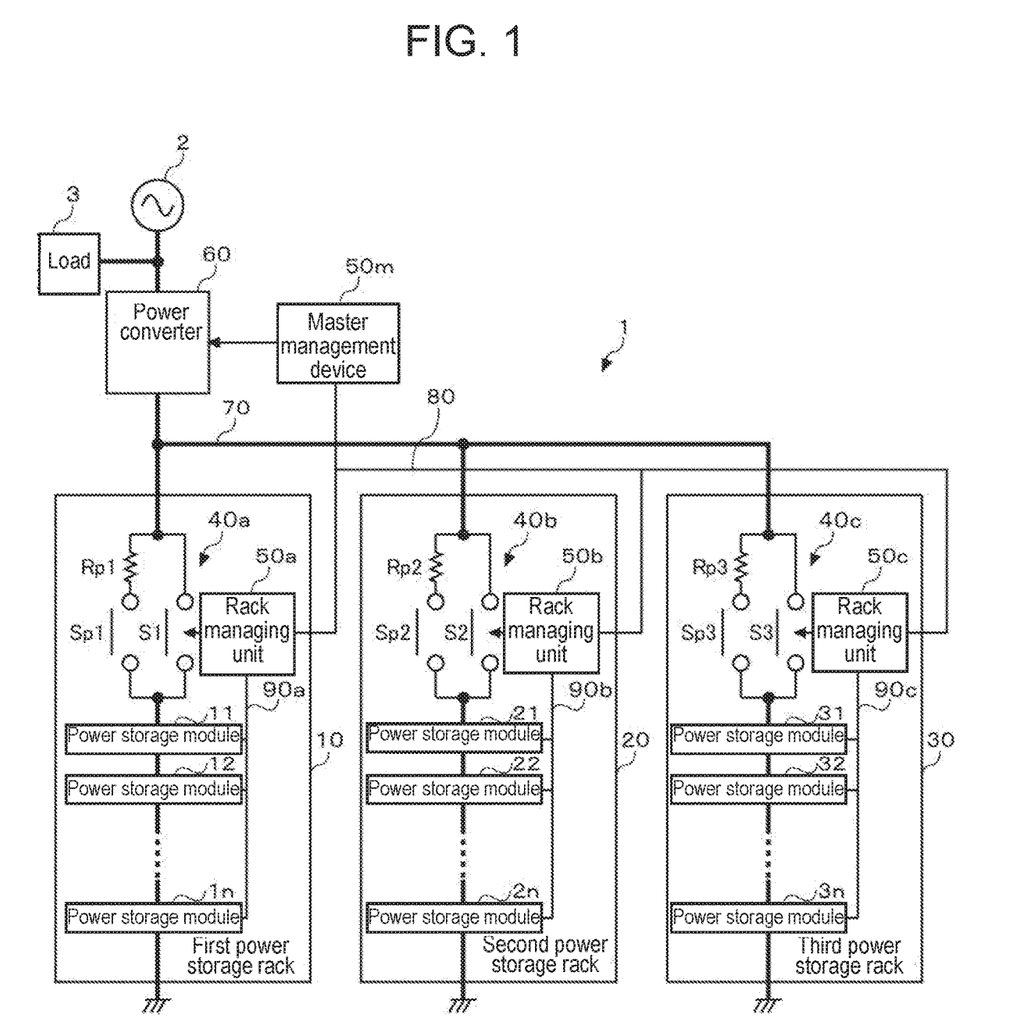
FIG. 1 is a drawing illustrating a configuration of a power storage system according to an exemplary embodiment of the present invention.

FIG. 1 is a drawing illustrating a configuration of power storage system 1 according to an exemplary embodiment of the present invention. Load 3 is connected to a distribution line between power storage system 1 and power system (power grid) 2. Power storage system 1 includes a plurality of power storage racks connected in parallel, power converter (power conditioning system (PCS)) 60, and master management device 50m. FIG. 1 illustrates an example of three power storage racks (first power storage rack 10, second power storage rack 20, and third power storage rack 30) connected in parallel with power converter 60.

Power converter 60 converts direct current (DC) power discharged from the plurality of power storage racks 10 to 30 into alternating current (AC) power to output it to power system 2 or load 3, and converts AC power sent from power system 2 into DC power to charge the plurality of power storage racks 10 to 30 connected in parallel. Power converter 60 can be made up of a typical power conditioner and includes a bidirectional inverter and a controlling circuit, as well as a bidirectional DC/DC converter if needed. In the description given hereinafter, it is, for example, assumed that power converter 60 includes the bidirectional DC/DC converter.

The bidirectional DC/DC converter is designed to control a current or voltage of the DC power charged into or discharged from the plurality of power storage racks 10 to 30. The bidirectional DC/DC converter, for example, provides constant current (CC)/constant voltage (CV) charging or CC/CV discharging. The bidirectional inverter converts DC power into AC power or converts AC power into DC power. In accordance with instructions from master management device 50m, the controlling circuit controls the bidirectional DC/DC converter and the bidirectional inverter.

First power storage rack 10 includes a plurality of power storage modules 11 to 1n connected in series, first rack managing unit 50a, and first switch unit 40a. Power storage modules 11 to 1n each include a plurality of cells connected in series or series and parallel and a monitoring circuit. Each of the cells may be a lithium ion battery cell, a nickel hydride battery cell, an electric double layer capacitor cell, or a lithium ion capacitor cell, for example. It is assumed hereinafter that the cells are lithium ion battery cells, for example.

The monitoring circuit in each of power storage modules 11 to 1n detects voltages, currents, and temperatures of the plurality of cells in each of power storage modules 11 to 1n. The monitoring circuit sends the detected voltages, currents, and temperatures of the cells to first rack managing unit 50a via in-rack communication line 90a. The communication between each of the monitoring circuits and first rack managing unit 50a may be, for example, serial communication conforming to RS-485 specifications. The monitoring circuits may be connected to first rack managing unit 50a through wireless communication or communication over a power line.

First switch unit 40a is interposed between power line 70 connecting to power converter 60 and the plurality of series-connected power storage modules 11 to 1n. First switch unit 40a includes first main relay S1, first pre-charge relay Sp1, and first pre-charge resistor Rp1. First pre-charge relay Sp1 and first pre-charge resistor Rp1 are connected in series and constitute a pre-charge circuit. The pre-charge circuit and first main relay S1 are connected in parallel and constitute a parallel circuit.

First pre-charge relay Sp1 is turned on first to pre-charge a capacitor component of the load with a current limited by first pre-charge resistor Rp1. Subsequently, first main relay S1 is turned on to prevent an inrush current from flowing into the load. After first main relay S1 is turned on, first pre-charge relay Sp1 is turned off to cut off electricity consumed by first pre-charge resistor Rp1.

In the description given hereinafter, it is assumed that first main relay S1 and first pre-charge relay Sp1 are, for example, general-purpose electromagnetic relays. The electromagnetic relay is a switch that is controlled to switch a contact between close and open by letting a current flow through a coil. At least one of first main relay S1 and first pre-charge relay Sp1 may be a semiconductor switch.

First rack managing unit 50a is composed of hardware and software resources working together. The hardware resource may be a microcomputer, a digital signal processor (DSP), a field programmable gate array (FPGA), another large scale integration (LSI) circuit, or an analog element. The software resource may be a program such as firmware. First rack managing unit 50a receives voltages, currents, and temperatures of the cells from the monitoring circuits of power storage modules 11 to 1n via in-rack communication line 90a.

First rack managing unit 50a estimates a state of charge (SOC) and a state of health (SOH) of the cells based on the received voltages, currents, and temperatures of the cells. The SOC and the SOH of the cells may be estimated by the monitoring circuits of power storage modules 11 to 1n.

The SOC can be estimated by a current integration method or an open circuit voltage (OCV) method. The SOH is specified by a ratio of present full charge capacity to initial full charge capacity. This value decreases as degradation increases. The SOH may be determined by measuring cell capacity through fully charging or discharging. The SOH may be estimated by referring to a table of relationships between internal resistance and SOH values that are acquired in advance by an experiment or a simulation. The internal resistance can be estimated by dividing a voltage drop occurring when a constant current flows through a cell for a given time by the constant current. The internal resistance has the following relationship: the internal resistance decreases as the temperature rises and increases as the battery degrades.

First rack managing unit 50a estimates state of power (SOP) levels for charging and discharging of first power storage rack 10. An SOP of first power storage rack 10 indicates a maximum amount of electricity that is allowed to be charged into or be discharged from first power storage rack 10. An SOPc for charging can be determined by multiplying maximum charge current Ic that satisfies a condition of not exceeding upper limit voltage (full charge voltage) Vmax of first power storage rack 10 by terminal voltage V of first power storage rack 10 (refer to Equations 1 and 2 below). Meanwhile, an SOPd for discharging can be determined by multiplying maximum discharge current Id that satisfies a condition of not falling below lower limit voltage (discharge termination voltage) Vmin of first power storage rack 10 by terminal voltage V of first power storage rack 10 (refer to Equations 3 and 4 below).

$$SOPc = IcV \quad \text{(Equation 1)}$$

$$Ic = (V\max - E)/R \quad \text{(Equation 2)}$$

$$SOPd = IdV \quad \text{(Equation 3)}$$

$$Id = (E - V\min)/R \quad \text{(Equation 4)}$$

where E is the electromotive force, and R is the internal resistance.

Electromotive force E depends on the SOC and increases as the SOC rises. The SOPc for charging is zero when first power storage rack 10 reaches upper limit voltage Vmax.

The SOPd for discharging is zero when first power storage rack 10 reaches lower limit voltage Vmin.

First rack managing unit 50a may estimate the SOP by referring to a table of relationships between SOC and SOP values that are acquired in advance by an experiment or a simulation. The SOP calculated by Equation 1 or 3 shown above decreases along with a reduction in SOH. Thus, the present SOP can be estimated by multiplying an initial SOP identified by reference to the table and the present SOH together. The SOP of each of the power storage racks (a rack SOP) is not limited to values defined by Equations 1 and 3 shown above and may be equal to a maximum power rating of the rack. In this case, the rack SOP for discharging when each of the power storage racks terminates discharging (SOC=0%) is set to zero, and the SOP for discharging returns to a value equal to the maximum power rating of the rack when the SOC, for example, gets to 2%. The rack SOP for charging when each of the power storage racks is fully charged (SOC=100%) is set to zero, and the SOP for charging returns to the value equal to the maximum power rating of the rack when the SOC, for example, gets to 98%. If the method of charging is pseudo CC/CV, the SOP for charging may gradually decrease from the maximum power rating of the rack to a small value.

First rack managing unit 50a is connected with master management device 50m, second rack managing unit 50b of second power storage rack 20, and third rack managing unit 50c of third power storage rack 30 through inter-rack communication line 80. Communication via inter-rack communication line 80 may be conducted using a communication scheme conforming to specifications of RS-485, Ethernet (registered trademark), or a controller area network (CAN), for example.

First rack managing unit 50a sends monitoring data on first power storage rack 10 to master management device 50m via inter-rack communication line 80. In this exemplary embodiment, the monitoring data sent to master management device 50m includes at least a value of the current flowing through first power storage rack 10 and the SOP of first power storage rack 10.

Second and third power storage racks 20 and 30 are similar in configuration and operation to first power storage rack 10, and hence a description of them is omitted.

Master management device 50m is composed of hardware and software resources working together. The hardware resource may be a microcomputer, a DSP, an FPGA, another LSI circuit, or an analog element. The software resource may be a program such as firmware. Master management device 50m communicates with rack managing units 50a to 50c via inter-rack communication line 80 and thereby manages the plurality of power storage racks 10 to 30. Master management device 50m transmits control signals to the controlling circuit of power converter 60. Master management device 50m may be configured to establish external communication with a management device of a system operator and/or a management device of a utility power system operator (both not shown).

Master management device 50m calculates the SOP of a whole of the plurality of power storage racks 10 to 30 connected in parallel (hereinafter referred to as a system SOP). The system SOP can be calculated by (Equation 5) shown below.

System $SOP$=Minimum rack $SOP$*(Total rack current/Maximum rack current)    (Equation 5)

Minimum rack SOP is a smallest value of the SOP values of the plurality of power storage racks 10 to 30. The total rack current is a total of values of currents respectively flowing through the plurality of power storage racks 10 to 30. The maximum rack current is a largest value of the values of the currents respectively flowing through the plurality of power storage racks 10 to 30. If the SOP and current values of the plurality of power storage racks 10 to 30 are ideally identical values respectively, the system SOP is a value of the multiplication product of the rack SOP and a number of the parallel-connected racks (3 in the example of FIG. 1). In contrast to this case, along with an increase in current deviation among the plurality of power storage racks 10 to 30, the system SOP decreases. In Equation 5 shown above, [Minimum rack SOP] may be replaced with [SOP of rack having minimum value in (rack current/rack SOP)]. If the currents of the power storage racks are zero or small, the system SOP can be estimated by parameters (internal resistance, wiring resistance, etc.) that determine a ratio of the current deviation.

The bidirectional DC/DC converter of power converter 60 can be controlled using the system SOP. The DC/DC converter may be controlled using a reduced power value described later. During charging of power storage system 1, master management device 50m transmits the calculated system SOPc as an upper limit level of charge power to the controlling circuit of power converter 60. The controlling circuit of power converter 60 divides the system SOPc acquired from master management device 50m by a system voltage and takes the quotient as an upper limit current value to control charging performed by the bidirectional DC/DC converter. During discharging of power storage system 1, master management device 50m transmits the calculated SOPd as an upper limit level of discharge power to the controlling circuit of power converter 60. The controlling circuit of power converter 60 divides the system SOPd acquired from master management device 50m by the system voltage and takes the quotient as an upper limit current value to control discharging performed by the bidirectional DC/DC converter. If power converter 60 has no bidirectional DC/DC converter, the controlling circuit of power converter 60 divides the system SOPc or the system SOPd acquired from master management device 50m by the system voltage and takes the quotient as an upper limit current value to control charging or discharging performed by the bidirectional inverter.

This exemplary embodiment has a circuit configuration in which no DC/DC converter is interposed between power converter 60 and each of power storage racks 10 to 30. Hence, this configuration does not enable control of individual currents flowing through power storage racks 10 to 30. Charge or discharge currents of power converter 60 allocated proportionally according to resistance components of respective power storage racks 10 to 30 flow through power storage racks 10 to 30.

During charging or discharging of power storage system 1 having the configuration described above, at least one of the power storage racks needs to be disconnected in response to occurrence of some instances. Such disconnection is necessary when an abnormality is detected in a particular power storage rack, for example. Specifically, the instances include the occurrence of a communication error in a particular power storage rack and the occurrence of overcurrent, overvoltage, undervoltage, a high-temperature abnormality, or a low-temperature abnormality in a cell in a particular power storage rack although any of the abnormalities is determined to be not urgent. If charge power of a particular power storage rack has exceeded the rack SOPc, if discharge power of a particular power storage rack has exceeded the rack SOPd, or if power converter 60 gets into a state that prevents the power converter from satisfying a newly calculated system SOP, the particular power storage rack needs to be disconnected. In response to the occurrence of any of these events, rack managing unit 50 of the power storage rack does not immediately turn off switch unit 40, but transmits a disconnection request signal to master management device 50m.

Disconnection of a particular power storage rack during charging or discharging of power storage system 1 necessitates turning off switch unit 40 in the power storage rack through which a current is flowing. Turning off switch unit 40 through which a current is flowing contributes to degradation of the electromagnetic relays of switch unit 40. General-purpose electromagnetic relays have a polarity and thus have a direction in which the current is readily shut off and a direction in which the current is difficult to be shut off. A high current flowing in the shut-off-difficult direction causes a failure such as welding. A bipolar relay results in high cost.

In response to a disconnection request signal sent from rack managing unit 50 of the particular power storage rack, master management device 50m decreases the upper limit level of charge power or discharge power controlled by power converter 60 from the system SOP to a predetermined reduced power value with proviso that a fall in power is allowed according to an operating status of the system. The reduced power value is not a fixed value but a variable value. Master management device 50m determines the reduced power value based on at least one of an operation mode in which power storage system 1 is put, a record of disconnection, and a manual setting. The master management device turns off switch unit 40 without decreasing power if a fall in power is not allowed according to the operating status of the system. In the case of a minor abnormality, the master management device preferably keeps a state of operation of the system without turning off switch unit 40 until a fall in power is allowed and turns off switch unit 40 at a time when a fall in power is allowed.

The electromagnetic relay decreases in mechanical durability with a rise in number of interruptions and decreases in electrical durability with an increase in degree of the current flowing through the contacts. Comprehensive durability of the electromagnetic relay is specified by a durability curve that is defined by a degree of the contact-flowing current and a number of interruptions. A maximum number of uses increases along with a decrease in the current flowing through the contacts at a time of interruption. The durability curve is defined polarity by polarity.

Master management device 50m, for example, sets the reduced power value to a value such that the current flowing through a single electromagnetic relay is less than or equal to 10 A. Influence on the electric durability of even a high-voltage, high-capacity electromagnetic relay is reduced if the contact-flowing current is approximately less than or equal to 10 A. The contact-flowing current may be 0 A. In this case, a current for determining a new system SOP needs to flow after the electromagnetic relay included in switch unit 40 is turned off. If a current of less than or equal to 10 A ($\neq$0 A) flows at a time of turning off the electromagnetic relay, a number of current value change times can be decreased by 1.

If the number of interruptions of the electromagnetic relay approaches the maximum number of uses, master management device 50m may set the reduced power value to a value such that the current flowing through the electromagnetic relay gets lower. This reduces the possibility that the electromagnetic relay becomes unusable due to the end of its life before reaching the maximum number of uses.

If the operation mode in which power storage system 1 is put is an autonomous mode and if load 3 is an important load, master management device 50m does not change the upper limit level of discharge power controlled by power converter 60. In other words, power converter 60 is not allowed to decrease discharge power. If power storage system 1 is, for example, used as a backup power source for a load that is installed at a medical facility, a communication facility, a data center, or another place and that is not permitted to undergo an instantaneous interruption during a power failure of power system 2, the master management device does not allow power converter 60 to decrease discharge power.

Meanwhile, if the operation mode in which power storage system 1 is put is a system interconnection mode, the master management device decreases the charge power or the discharge power controlled by power converter 60 to the reduced power value. Even if the operation mode in which power storage system 1 is put is the autonomous mode, the master management device decreases the discharge power controlled by power converter 60 to the reduced power value with proviso that load 3 is a load that is permitted to undergo an instantaneous interruption.

Master management device 50m can set the reduced power value to a setting value manually set by an administrator or a user. If a manually set setting value exists, the setting value basically takes precedence over other values.

Master management device 50m transmits the set reduced power value as an upper limit level of charge/discharge power to the controlling circuit of power converter 60. The controlling circuit of power converter 60 divides the reduced power value acquired from master management device 50m by the system voltage and takes the quotient as an upper limit current value to control charging/discharging performed by the bidirectional DC/DC converter.

After the charge/discharge power controlled by power converter 60 is decreased to the reduced power value, master management device 50m sends a disconnection command signal to rack managing unit 50 that has sent the disconnection request signal. When receiving the disconnection command signal, rack managing unit 50 turns off switch unit 40 in the power storage rack that it manages.

Master management device 50m acquires the rack SOP and current values from rack managing units 50 of the remaining power storage racks in power storage system 1 to recalculate the system SOP. Master management device 50m transmits the recalculated system SOP as an upper limit level of charge/discharge power to the controlling circuit of power converter 60. The controlling circuit of power converter 60 divides the system SOP acquired from master management device 50m by the system voltage and takes the quotient as an upper limit current value to control charging/discharging performed by the bidirectional DC/DC converter.

An instance is cited below in which a disconnected power storage rack returns to power storage system 1 during charging or discharging of power storage system 1. Reconnecting a power storage rack that is disconnected and scheduled to be connected to power storage system 1 requires that a remaining capacity in the power storage rack scheduled to be connected is near to an average remaining capacity of the remaining capacities in power storage racks connected to power storage system 1 being charged or discharged. If a difference in remaining capacity between the disconnected and the connected racks is large, a high current flows between the disconnected and the connected racks.

Figure 2:
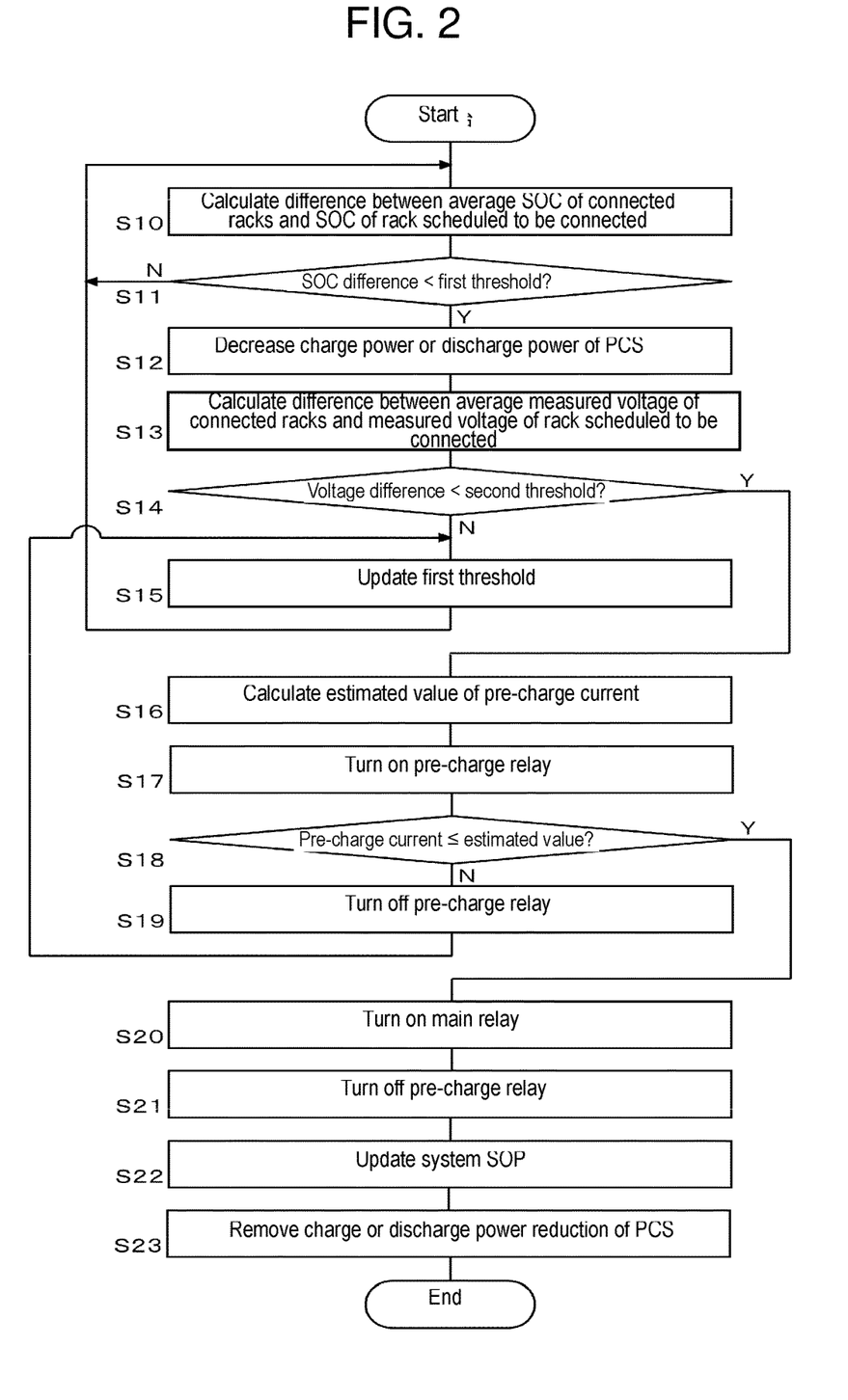
FIG. 2 is a flowchart illustrating a process that is executed by the power storage system according to the exemplary embodiment of the present invention when a disconnected power storage rack returns to the power storage system.

FIG. 2 is a flowchart illustrating a process that is executed by power storage system 1 according to the exemplary embodiment of the present invention when a disconnected power storage rack returns to the power storage system. When receiving a connection request signal from rack managing unit 50 of a power storage rack that is disconnected from and scheduled to be connected to the power storage system, master management device 50*m* acquires an SOC level of the disconnected power storage rack from rack managing unit 50 of the power storage rack and acquires SOC levels of the connected power storage racks from rack managing units 50 of the power storage racks. Master management device 50*m* calculates a difference between an average value of the SOC levels of the connected power storage racks and the SOC level of the power storage rack scheduled to be connected (S10). If a number of the connected power storage racks is large, a median value of the SOC levels may be used instead of the average value of the SOC levels.

Master management device 50*m* compares the calculated SOC level difference with a first threshold (S11). The first threshold is a threshold used to determine whether the return of the disconnected power storage rack is permitted from a SOC standpoint and is a value derived in advance from an experiment or a simulation. If the SOC level difference is less than the first threshold (Y in S11), master management device 50*m* decreases the upper limit level of charge power or discharge power controlled by power converter 60 from the system SOP to a predetermined reduced power value (S12). The predetermined reduced power value may be a value identical to the above-described reduced power value used for disconnection, or the reduced power values used for returning to and disconnecting from the power storage system may differ from each other.

Master management device 50*m* acquires a measured voltage of the power storage rack scheduled to be connected from rack managing unit 50 of the power storage rack and acquires measured voltages of the connected power storage racks from rack managing units 50 of the power storage racks. The measured voltage of the power storage rack scheduled to be connected is OCV. If the reduced power value described above is zero, the measured voltages of the connected power storage racks are also OCV. If the reduced power value described above is not zero, the measured voltages of the connected power storage racks are values close to OCV since current and resistance components approach to zero as the reduced power value gets closer to zero. Master management device 50*m* calculates a difference between an average value of the measured voltages of the connected power storage racks and the measured voltage of the power storage rack scheduled to be connected (S13). If the number of the connected power storage racks is large, a median value of the measured voltages may be used instead of the average value of the measured voltages. The measured voltages of the respective connected power storage racks are ideally identical and hence the measured voltage of any one of the connected power storage racks may be used.

Master management device 50*m* compares the calculated voltage difference with a second threshold (S14). The second threshold is a threshold used to determine whether the return of the disconnected power storage rack is permitted from an OCV standpoint and is a value derived in advance from an experiment or a simulation. If the measured voltage difference is greater than or equal to the second threshold (N in S14), master management device 50*m* updates the first threshold to a tighter level (S15). If the SOC level difference is less than the first threshold, the measured voltage difference should naturally be less than the second threshold. However, an error in SOC estimation can cause the measured voltage difference to be greater than or equal to the second threshold. In this case, the master management device adds a value greater than or equal to the difference between the SOC level difference and the first threshold to the first threshold to update the first threshold to a level that compensates the SOC estimation error.

If the measured voltage difference is less than the second threshold (Y in S14), master management device 50*m* calculates an estimated value of a current flowing into pre-charge relay Sp connected to the power storage rack scheduled to be connected based on the difference between the average measured voltage of the connected power storage racks and the measured voltage of the power storage rack scheduled to be connected (S16). Master management device 50*m* sends a connection command signal to rack managing unit 50 of the power storage rack scheduled to be connected. When receiving the connection command signal, rack managing unit 50 turns on pre-charge relay Sp in the power storage rack that it manages (S17).

Master management device 50*m* acquires a measured value of the current flowing into pre-charge relay Sp from rack managing unit 50 of the power storage rack scheduled to be connected and compares the measured pre-charge current value with the estimated value described above (S18). If the measured pre-charge current value is greater than the estimated value (N in S18), master management device 50*m* sends a disconnection command signal to rack managing unit 50 of the power storage rack anew connected. When receiving the disconnection command signal, rack managing unit 50 turns off pre-charge relay Sp in the power storage rack that it manages (S19).

Simultaneously with the sending of the disconnection command signal described above, master management device 50*m* updates the first threshold to a tighter level (S15). If the SOC level difference is less than the first threshold and if the measured voltage difference is less than the second threshold, the measured pre-charge current value should naturally be less than or equal to the estimated value. However, an error in SOC estimation and voltage measurement can cause the measured pre-charge current value to be greater than the estimated value. In this case, the master management device adds a value greater than or equal to the difference between the SOC level difference corresponding to the measured voltage difference and the first threshold to the first threshold to update the first threshold to a level that compensates the error in SOC estimation and voltage measurement.

In step S18 described above, if the measured pre-charge current value is less than or equal to the estimated value (Y in S18), the rack managing unit turns on the main relay in the power storage rack that it manages (S20) and subsequently turns off pre-charge relay Sp (S21). Master management device 50*m* calculates a system SOP of power storage system 1 that includes the power storage rack anew connected. Master management device 50*m* specifies the new calculated system SOP for power converter 60 to update the system SOP (S22). After updating the system SOP, power converter 60 removes charge or discharge power reduction (S23).

Reversal of the sequence of system SOP updating and reduction removal entails a risk that the charge or discharge power after reduction removal exceeds the new system SOP. If the charge or discharge power controlled by power converter 60 is not reduced prior to the connection of the disconnected power storage rack, there is a risk that the charge or discharge power controlled by power converter 60 exceeds the new system SOP of the three parallel-connected racks on the instant that the power storage rack is connected.

Figure 3:
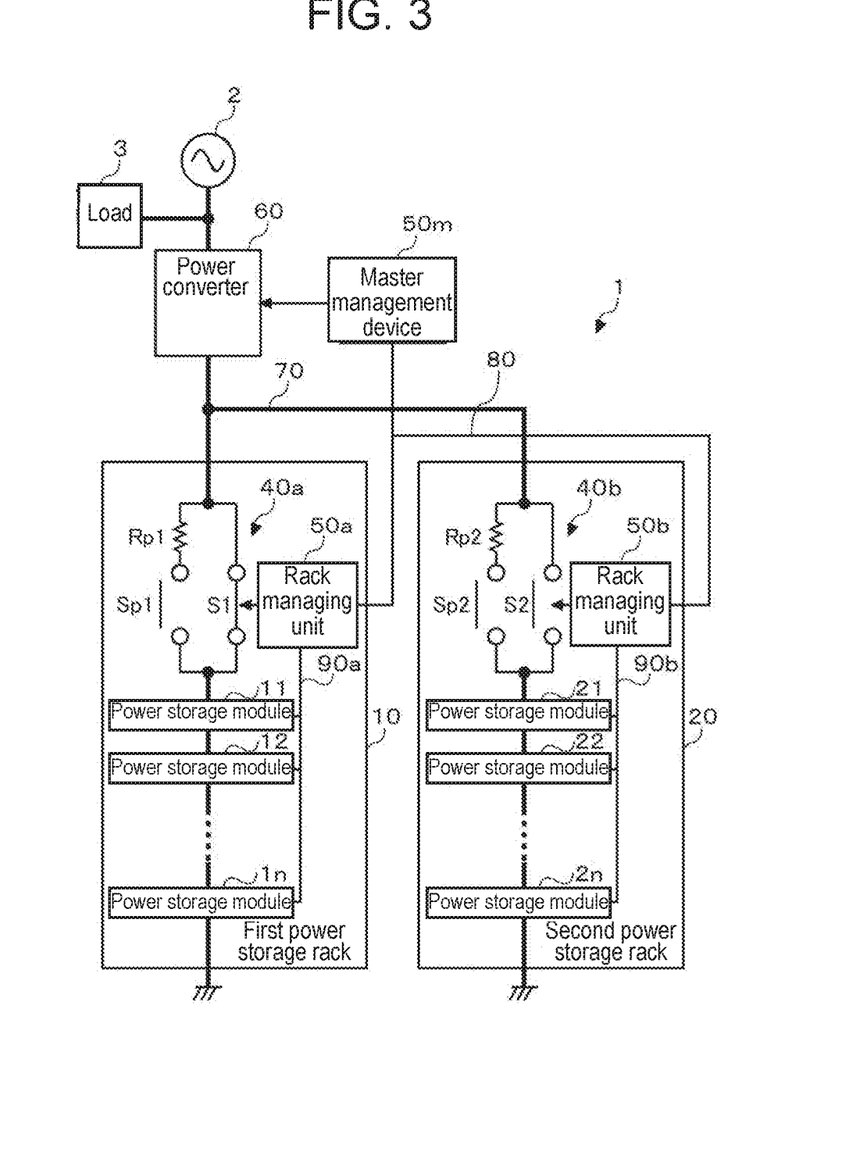
FIG. 3 is a circuit diagram for illustrating an example process executed by the power storage system according to the exemplary embodiment of the present invention.

A power storage system will be described below by citing a specific example process. Power storage system 1 that executes the example process includes two power storage racks 10, 20 connected in parallel for the sake of simplification.

Figure 4:
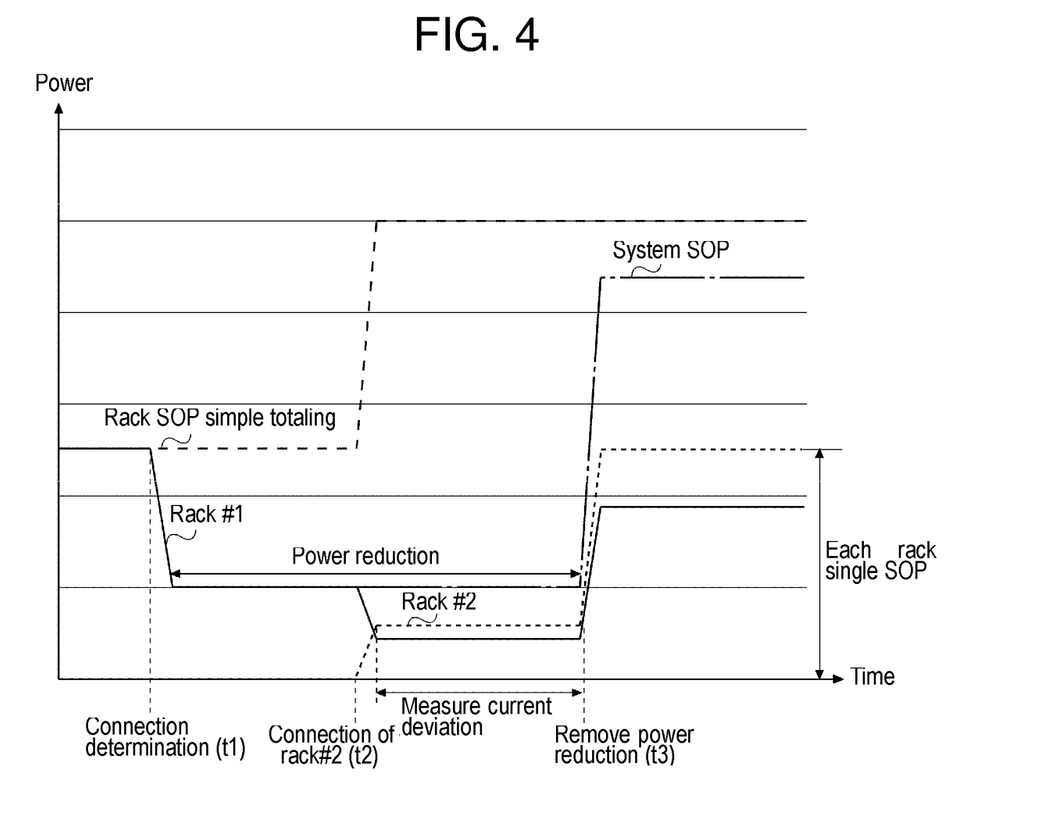
FIG. 4 is a timing chart for illustrating the example process executed by the power storage system according to the exemplary embodiment of the present invention.

FIG. 3 is a circuit diagram for illustrating an example process executed by power storage system 1 according to the exemplary embodiment of the present invention. FIG. 4 is a timing chart for illustrating the example process executed by power storage system 1 according to the exemplary embodiment of the present invention. With reference to FIG. 3, an instance is cited in which first power storage rack 10 is connected and second power storage rack 20 that is disconnected is to be returned to power storage system 1 by connecting to power line 70.

At time t1 in FIG. 4, master management device 50m executes a step for determining whether connection of second power storage rack 20 is permitted. In FIG. 4, the master management device determines that the connection of second power storage rack 20 is permitted and reduces charge or discharge power controlled by power converter 60. Accordingly, charge or discharge power for first power storage rack 10 decreases. At time t2, second rack managing unit 50b turns on second pre-charge relay Sp2 to connect second power storage rack 20 to power storage system 1. If the power storage system is in an ideal state without deviation in current between first and second power storage racks 10 and 20, the system SOP of power storage system 1 is a total amount of the SOP of first power storage rack 10 and the SOP of second power storage rack 20.

While the charge or discharge power controlled by power converter 60 is kept at a reduced power value after second power storage rack 20 is connected, master management device 50m measures a deviation in current between first and second power storage racks 10 and 20 and calculates the system SOP of power storage system 1. At time t3, master management device 50m updates the system SOP and specifies or sets the updated system SOP for power converter 60, so that power converter 60 removes charge or discharge power reduction.

According to the present exemplary embodiment described above, the power storage system, while the charge or discharge power controlled by power converter 60 is kept at a reduced power value, measures a deviation in current between the power storage rack scheduled to be connected and the power storage racks connected to the system and updates the system SOP based on the deviation in current before removing the charge or discharge power reduction described above. The power storage system calculates the system SOP by taking into account an amount of decrease caused by the deviation in current as well as the number of the connected power storage racks. Thus, during charging or discharging of the plurality of the parallel-connected power storage racks, the power storage system prevents a flow of an excessively high current into some of the power storage racks. Even if a deviation in current occurs after connection, the power storage system is able to continue charging or discharging without permitting the electric power of any of the power storage racks to exceed the SOP of each of the power storage racks. Calculating the system SOP does not entail estimating internal resistance of each of the power storage racks. This helps lower calculation and memory costs.

The master management device decreases the charge or discharge power controlled by power converter 60 and hence the measured voltages of the power storage racks approximate to OCV. This improves accuracy in estimating the remaining capacity in the power storage racks. This also helps prolong the life of the electromagnetic relay. The master management device determines the reduced power value adaptively in consideration of factors such as a record of action of the electromagnetic switch and thus helps prolong the life of the electromagnetic relay.

The power storage rack includes the pre-charge relay and the rack managing unit turns off the pre-charge relay in response to a flow of the pre-charge current having a level greater than the estimated value. This prevents the occurrence of an excessively high current. The disconnected power storage rack is allowed to be connected without the occurrence of an inrush current, even if the voltage applied to power line 70 (e.g., a bus bar) has changed to zero as a result of disconnection of another power storage rack just before a start of a connection sequence. Power storage system 1 is able to safely continue charging or discharging without allowing an inrush current to flow into the power storage rack scheduled to be connected, even if another power storage rack is abnormally disconnected after connection determination has been completed by software.

The present invention has been described with reference to the exemplary embodiment. Those skilled in the art will comprehend that the exemplary embodiment is an example, the combinations of the constituent elements and the processing steps can be modified in various ways, but nevertheless such modifications are included in the scope of the present invention.

In steps S10 and S11 in FIG. 2, as described above, the master management device determines a SOC level difference between the power storage rack scheduled to be connected and the connected power storage racks.

In steps S13 and S14, the master management device determines a measured voltage difference between the scheduled-to-be-connected and the connected racks. In this regard, the master management device may determine a measured voltage difference between the scheduled-to-be-connected and the connected racks in steps S10 and S11, as well as in steps S13 and S14. This instance also serves the purpose of making a double check because currents flowing through the connected power storage racks differ in quantity between steps S10, S11 and steps S13, S14.

In the exemplary embodiment described above, master management device 50m is disposed outside rack managing units 50a to 50c. However, the master management device may be disposed in any of rack managing units 50a to 50c.

The exemplary embodiment may be specified by the following items.

[Item 1]

Power storage system (1) including: a plurality of power storage blocks (10 to 30) connected in parallel; power converter (60) converting direct current (DC) power discharged from the plurality of power storage blocks (10 to 30) into alternating current (AC) power to output the AC power to power system (2) or load (3) and converting AC power sent from power system (2) into DC power to charge the plurality of power storage blocks (10 to 30); a plurality of switches (40a to 40c) interposed between the plurality of respective power storage blocks (10 to 30) and power converter (60); and management device (50m) calculating a state of power (SOP) of a whole of the plurality of power storage blocks (10 to 30) based on an SOP of each of the plurality of power storage blocks (10 to 30) to specify the calculated SOP of the whole for an upper limit level of power or current for at least one of charging and discharging controlled by power converter (60), in which at least one (10) of the plurality of power storage blocks (10 to 30) connected in parallel is disconnected from the power storage system on condition that at least one (40*a*) of the plurality of switches (40*a* to 40*c*) is turned off, and when at least one switch (40*a*) is turned on to return at least one disconnected power storage block (10) to the power storage system having the parallel-connected power storage blocks, the management device calculates an SOP of a whole of power storage blocks (10 to 30) after a return of at least one power storage block (10) based on a deviation in current between each of power storage blocks (10 to 30) including the at least one returned power storage block to determine an upper limit level of power or current flowing into power converter (60).

This configuration enables the power storage system to continue stable operation even if at least one (30) of the plurality of power storage blocks (10 to 30) connected in parallel is disconnected from the system or even if at least one disconnected power storage block (30) is returned to the system.

[Item 2]

Power storage system (1) according to item 1, in which management device (50*m*) calculates the SOP of the whole of power storage blocks (10 to 30) including the at least one returned power storage block by dividing a total of values of currents flowing through respective power storage blocks (10 to 30) after the return of the at least one power storage block by a largest value of the values of the currents to determine a quotient and multiplying a smallest value of values of the SOP of each of power storage blocks (10 to 30) including the at least one returned power storage block by the quotient.

This allows the management device to factor in a deviation in current between each of power storage blocks (10 to 30) including the at least one returned power storage block in calculating the SOP of the whole of power storage blocks (10 to 30) including the at least one returned power storage block.

[Item 3]

Power storage system (1) according to either item 1 or 2, in which at least one (10) of the plurality of power storage blocks (10 to 30) is disconnected from the power storage system, and management device (50*m*) decreases the upper limit level of power or current flowing into power converter (60) to a predetermined power value or a current value and subsequently turns on at least one switch (40*a*) to return at least one disconnected power storage block (10) to the power storage system having parallel-connected power storage blocks (20, 30), and the management device calculates the SOP of the whole of the plurality of power storage blocks (10 to 30) including the at least one returned power storage block while the upper limit level of power or current is kept lowered at the predetermined power value or the current value.

This averts the occurrence of an excessively high current and reduces stress put on switch (40*a*) to help prolong the life of switch (40*a*).

[Item 4]

Power storage system (1) according to any one of items 1 to 3, in which while at least one (10) of the plurality of power storage blocks (10 to 30) is disconnected from the power storage system, management device (50*m*) does not turn on at least one switch (40*a*) on condition that a difference between a state of charge (SOC) level of at least one power storage block (10) and an average value or a median value of SOC levels of power storage blocks (20, 30) remaining in the power storage system is greater than a predetermined first threshold.

This prevents at least one switch (40*a*) from being turned on and thereby prevents the occurrence of an excessively high current.

[Item 5]

The power storage system according to any one of items 1 to 4, in which management device (50*m*) stops turning on at least one switch (40*a*) on condition that after the upper limit level of power or current flowing into power converter (60) is decreased to a predetermined power value or a current value, a difference between a measured voltage of at least one power storage block (10) and either of an average value or a median value of measured voltages of power storage blocks (20, 30) remaining in the power storage system or a measured voltage of any one of the remaining power storage blocks is greater than a predetermined second threshold.

This enables the management device to determine whether or not the connection of power storage block (10) scheduled to be connected is permitted based on the difference between the voltages measured while the upper limit level of power or current for power converter (60) is kept lowered. Hence, the management device provides improved determination accuracy.

[Item 6]

Power storage system (1) according to any one of items 1 to 5, in which switch (40*a*) includes: main switch (S1); and a pre-charge circuit connected in parallel to main switch (S1), the pre-charge circuit including switch (Sp1) for pre-charging and resistor (Rp1) that are connected in series, and management device (50*m*) decreases the upper limit level of power or current flowing into power converter (60) to a predetermined power value or a current value and subsequently turns on switch (Sp1) for pre-charging before turning on main switch (S1).

This prevents the occurrence of an inrush current.

[Item 7]

Management device (50*m*) connected to power storage system (1) that includes: a plurality of power storage blocks (10 to 30) connected in parallel; power converter (60) converting direct current (DC) power discharged from the plurality of power storage blocks (10 to 30) into alternating current (AC) power to output the AC power to power system (2) or load (3) and converting AC power sent from power system (2) into DC power to charge the plurality of power storage blocks (10 to 30); and a plurality of switches (40*a* to 40*c*) interposed between the plurality of respective power storage blocks (10 to 30) and power converter (60), in which management device (50*m*) calculates a state of power (SOP) of a whole of the plurality of power storage blocks (10 to 30) based on an SOP of each of the plurality of power storage blocks (10 to 30) to specify the calculated SOP of the whole for an upper limit level of power or current for at least one of charging and discharging controlled by power converter (60), and at least one (10) of the plurality of power storage blocks (10 to 30) connected in parallel is disconnected from the power storage system on condition that at least one (40*a*) of the plurality of switches (40*a* to 40*c*) is turned off, and when at least one switch (40*a*) is turned on to return at least one disconnected power storage block (10) to the power storage system having the parallel-connected power storage blocks, the management device calculates an SOP of a whole of power storage blocks (10 to 30) after a return of at least one power storage block (10) based on a deviation in current between each of power storage blocks (10 to 30) including the at least one returned power storage block to determine an upper limit level of power or current flowing into power converter (60).

This configuration enables the power storage system to continue stable operation even if at least one (30) of the plurality of power storage blocks (10 to 30) connected in parallel is disconnected from the system or even if at least one disconnected power storage block (30) is returned to the system.

The invention claimed is:

1. A power storage system comprising:
a plurality of power storage blocks connected in parallel; a power converter converting direct current (DC) power discharged from the plurality of the power storage blocks into alternating current (AC) power to output the AC power to a power system or a load and converting AC power sent from the power system into DC power to charge the plurality of the power storage blocks; a plurality of switches interposed between the plurality of respective power storage blocks and the power converter; and a management device calculating a state of power (SOP) of all the plurality of the power storage blocks based on a SOP of each of the plurality of the power storage blocks to specify the calculated SOP of all the plurality of power storage blocks for an upper limit level of power or current for at least one of charging and discharging controlled by the power converter, wherein at least one of the plurality of the power storage blocks connected in parallel is disconnected from the power storage system on condition that at least one of the plurality of the switches is turned off, and when the at least one switch is turned on to reconnect the at least one disconnected power storage block to the power storage system having the parallel-connected power storage blocks, the management device calculates a SOP of all the power storage blocks after the reconnect of the at least one power storage block based on a deviation in current between each of the power storage blocks including the at least one reconnected power storage block to determine an upper limit level of power or current flowing into the power converter.

2. The power storage system according to claim 1, wherein the management device determines a quotient by dividing a total of values of currents flowing through the respective power storage blocks after the reconnect of the at least one power storage block by a largest value of the values of the currents, and multiplies a smallest value of values of the SOP of each of the power storage blocks including the at least one reconnected power storage block by the quotient, to calculate the SOP of all the power storage blocks including the at least one reconnected power storage block.

3. The power storage system according to claim 1, wherein at least one of the plurality of power storage blocks is disconnected from the power storage system, and the management device decreases the upper limit level of power or current flowing into the power converter to a predetermined power value or a current value and subsequently turns on the at least one switch to reconnect the at least one disconnected power storage block to the power storage system having the parallel-connected power storage blocks, and the management device calculates the SOP of all the plurality of power storage blocks including the at least one reconnected power storage block while the upper limit level of power or current is kept lowered at the predetermined power value or the current value.

4. The power storage system according to claim 1, wherein while at least one of the plurality of power storage blocks is disconnected from the power storage system, the management device does not turn on the at least one switch corresponding to the at least one disconnected power storage block on condition that a difference between a state of charge (SOC) level of the at least one disconnected power storage block and an average value or a median value of SOC levels of the power storage blocks remaining in the power storage system is greater than a predetermined first threshold.

5. The power storage system according to claim 1, wherein the management device stops turning on the at least one switch on condition that after the upper limit level of power or current flowing into the power converter is decreased to a predetermined power value or a current value, a difference between a measured voltage of the at least one power storage block and either of an average value or a median value of measured voltages of the power storage blocks remaining in the power storage system or a measured voltage of any one of the remaining power storage blocks is greater than a predetermined second threshold.

6. The power storage system according to claim 1, wherein
each of the switches includes:
a main switch; and
a pre-charge circuit connected in parallel to the main switch, the pre-charge circuit including a switch for pre-charging and a resistor that are connected in series, and
the management device decreases the upper limit level of power or current flowing into the power converter to a predetermined power value or a current value and subsequently turns on the switch for pre-charging before turning on the main switch.

7. A management device connected to a power storage system that includes: a plurality of power storage blocks connected in parallel; a power converter converting direct current (DC) power discharged from the plurality of power storage blocks into alternating current (AC) power to output the AC power to a power system or a load and converting AC power sent from the power system into DC power to charge the plurality of power storage blocks; and a plurality of switches interposed between the plurality of respective power storage blocks and the power converter, wherein the management device calculates a state of power (SOP) of all the plurality of power storage blocks based on a SOP of each of the plurality of power storage blocks to specify the calculated SOP of all the plurality of power storage blocks for an upper limit level of power or current for at least one of charging and discharging controlled by the power converter, and at least one of the plurality of power storage blocks connected in parallel is disconnected from the power storage system on condition that at least one of the plurality of switches is turned off, and when the at least one switch is turned on to reconnect the at least one disconnected power storage block to the power storage system having the parallel-connected power storage blocks, the management device calculates a SOP of all the power storage blocks after the reconnect of the at least one power storage block based on a deviation in current between each of the power storage blocks including the at least one reconnected power storage block to determine an upper limit level of power or current flowing into the power converter.

* * * * *